US012739106B2

(12) United States Patent
Rand et al.

(10) Patent No.: US 12,739,106 B2
(45) **Date of Patent: *Sep. 15, 2026**

(54) TECHNIQUES FOR CIRCUMVENTING PROVIDER-IMPOSED LIMITATIONS IN SNAPSHOT INSPECTION OF DISKS FOR CYBERSECURITY

(71) Applicant: Wiz, Inc., New York, NY (US)

(72) Inventors: Shahar Rand, Haifa (IL); Eric Abramov, Holon (IL); Yaniv Shaked, Tel Aviv (IL); Elad Gabay, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/990,045

(22) Filed: Dec. 20, 2024

(65) Prior Publication Data

US 2025/0125951 A1 Apr. 17, 2025

Related U.S. Application Data

(63) Continuation of application No. 18/649,529, filed on Apr. 29, 2024, now Pat. No. 12,219,053, which is a (Continued)

(51) Int. Cl.

*H04L 29/06* (2006.01)
*H04L 9/08* (2006.01)
*H04L 9/40* (2022.01)

(52) U.S. Cl.

CPC ........ *H04L 9/0861* (2013.01); *H04L 63/1416* (2013.01)

(58) Field of Classification Search

None

See application file for complete search history.

(56) References Cited

U.S. PATENT DOCUMENTS 6,910,132 B1 6/2005 Bhattacharya
7,627,652 B1 12/2009 Commons et al.

(Continued)

FOREIGN PATENT DOCUMENTS

CN 106462439 A 2/2017
CN 109240804 A 1/2019

(Continued)

OTHER PUBLICATIONS

Zhang, Lijun et al. The forensic analysis of encrypted Truecrypt volumes, 2014 IEEE International Conference on Progress in Informatics and Computing. https://ieeexplore.ieee.org/stamp/stamp.jsp?tp=&arnumber=6972366 (Year: 2014).*

(Continued)

*Primary Examiner* — Jeremiah L Avery

(74) *Attorney, Agent, or Firm* — M&B IP Analysts, LLC

(57) ABSTRACT

A system and method reduces use of restricted operations in a cloud computing environment during cybersecurity threat inspection. The method includes: detecting an encrypted disk in a cloud computing environment, the encrypted disk encrypted utilizing a first key in a key management system (KMS); generating a second key in the KMS, the second key providing access for a principal of an inspection environment; generating a snapshot of the encrypted disk; generating a volume based on the snapshot, wherein the volume is re-encrypted with the second key; generating a snapshot of the re-encrypted volume; generating an inspectable disk from the snapshot of the re-encrypted volume; and initiating inspection for a cybersecurity object on the inspectable disk.

19 Claims, 6 Drawing Sheets

Related U.S. Application Data continuation of application No. 18/359,493, filed on Jul. 26, 2023, now Pat. No. 12,081,656, which is a continuation-in-part of application No. 18/146,074, filed on Dec. 23, 2022, and a continuation-in-part of application No. 18/146,076, filed on Dec. 23, 2022.

(60) Provisional application No. 63/266,031, filed on Dec. 27, 2021.

(56) References Cited

U.S. PATENT DOCUMENTS 7,784,101 B2 8/2010 Verbowski et al.
8,104,075 B2 1/2012 Spector
8,200,965 B2 6/2012 Fujibayashi et al.
8,320,558 B1 11/2012 Zea
8,352,431 B1 1/2013 Protopopov et al.
8,412,688 B1 4/2013 Armangau et al.
8,413,239 B2 4/2013 Sutton
8,417,967 B2 4/2013 Foster et al.
8,499,354 B1 7/2013 Satish et al.
8,595,822 B2 11/2013 Schrecker et al.
8,701,200 B2 4/2014 Naldurg et al.
8,789,049 B2 7/2014 Hutchins et al.
8,813,234 B1 8/2014 Bowers et al.
8,898,481 B1 11/2014 Osburn, III et al.
8,904,525 B1 12/2014 Hodgman et al.
8,914,406 B1 12/2014 Haugsnes
9,009,836 B1 4/2015 Yarykin et al.
9,094,379 B1 7/2015 Miller
9,119,017 B2 8/2015 Sinha
9,165,142 B1 10/2015 Sanders et al.
9,172,621 B1 10/2015 Dippenaar
9,182,973 B2 11/2015 Hong et al.
9,185,136 B2 11/2015 Dulkin et al.
9,330,273 B2 5/2016 Khetawat et al.
9,369,433 B1 6/2016 Paul
9,419,996 B2 8/2016 Porat
9,438,634 B1 9/2016 Ross et al.
9,459,803 B1 10/2016 Yang et al.
9,467,473 B2 10/2016 Jayaraman
9,535,731 B2 1/2017 Ashley et al.
9,544,327 B1 1/2017 Sharma et al.
9,563,385 B1 2/2017 Kowalski et al.
9,569,328 B2 2/2017 Pavlov et al.
9,582,662 B1 2/2017 Messick et al.
9,596,235 B2 3/2017 Badam et al.
9,607,104 B1 3/2017 Turner et al.
9,621,595 B2 4/2017 Lian et al.
9,646,172 B1 5/2017 Hahn
9,661,009 B1 5/2017 Karandikar et al.
9,665,465 B1 5/2017 Jain et al.
9,672,355 B2 6/2017 Titonis et al.
9,712,503 B1 7/2017 Ahmed
9,892,261 B2 2/2018 Joram et al.
9,992,186 B1 6/2018 Drozd et al.
10,002,247 B2 6/2018 Suarez et al.
10,009,337 B1 6/2018 Fischer et al.
10,032,032 B2 7/2018 Suarez et al.
10,044,723 B1 8/2018 Fischer et al.
10,063,445 B1 8/2018 Preece
10,135,826 B2 11/2018 Reddy
10,205,638 B1 2/2019 Angrish et al.
10,229,125 B2 3/2019 Goodman et al.
10,255,370 B2 4/2019 Carpenter et al.
10,360,025 B2 7/2019 Foskett et al.
10,362,046 B1 7/2019 Srinivasan et al.
10,412,103 B2 9/2019 Haugsnes
10,412,109 B2 9/2019 Loureiro et al.
10,459,664 B1 10/2019 Dreier et al.
10,503,904 B1 12/2019 Singh et al.
10,509,909 B2 12/2019 Andriani
10,511,590 B1 12/2019 Bosch et al.
10,536,471 B1 1/2020 Derbeko et al.
10,540,499 B2 1/2020 Wailly et al.
10,552,610 B1 2/2020 Vashisht et al.
10,554,507 B1 2/2020 Siddiqui et al.
10,567,468 B2 2/2020 Perlmutter
10,572,226 B2 2/2020 Biskup et al.
10,574,675 B2 2/2020 Peppe et al.
10,623,386 B1 * 4/2020 Bernat .................. H04L 63/061
10,630,642 B2 4/2020 Clark et al.
10,664,619 B1 5/2020 Marelas
10,691,636 B2 6/2020 Tabaaloute et al.
10,721,260 B1 7/2020 Schlarp et al.
10,725,775 B2 7/2020 Suarez et al.
10,728,252 B2 7/2020 Desai et al.
10,735,430 B1 8/2020 Stoler
10,735,442 B1 8/2020 Swackhamer
10,791,138 B1 9/2020 Siddiqui et al.
10,803,188 B1 10/2020 Rajput et al.
10,812,521 B1 10/2020 Sharifi Mehr
10,831,898 B1 11/2020 Wagner
10,887,333 B1 1/2021 Pereira et al.
10,915,626 B2 2/2021 Tang
10,924,503 B1 2/2021 Pereira et al.
10,949,406 B1 3/2021 Calvo et al.
10,972,484 B1 4/2021 Swackhamer
10,984,098 B2 4/2021 Lavi et al.
10,997,293 B2 5/2021 Wiest et al.
11,005,860 B1 5/2021 Glyer et al.
11,016,954 B1 5/2021 Babocichin et al.
11,044,118 B1 * 6/2021 Reed ....................... H04L 12/66
11,055,414 B2 7/2021 Claes
11,064,032 B1 7/2021 Yang et al.
11,099,976 B2 8/2021 Khakare et al.
11,102,231 B2 8/2021 Kraning et al.
11,165,652 B1 11/2021 Byrne
11,216,563 B1 1/2022 Veselov et al.
11,245,730 B2 2/2022 Bailey
11,256,759 B1 2/2022 Chen et al.
11,258,825 B1 2/2022 Yang et al.
11,271,961 B1 3/2022 Berger
11,277,432 B2 3/2022 Hassanzadeh et al.
11,295,009 B2 4/2022 Brossard et al.
11,334,670 B2 5/2022 Franco et al.
11,336,555 B2 5/2022 Soh et al.
11,366,897 B1 * 6/2022 Ramanathan ......... H04L 9/0861
11,388,183 B2 7/2022 Hoopes et al.
11,397,808 B1 7/2022 Prabhu et al.
11,418,528 B2 8/2022 Deardorff et al.
11,442,989 B2 9/2022 Dvinov et al.
11,444,974 B1 9/2022 Shakhzadyan
11,483,317 B1 10/2022 Bolignano et al.
11,496,498 B2 11/2022 Wright et al.
11,496,519 B1 * 11/2022 Gupta .................. H04L 9/0891
11,503,063 B2 11/2022 Rao
11,507,672 B1 11/2022 Pagnozzi et al.
11,509,658 B1 11/2022 Kulkarni
11,516,222 B1 11/2022 Srinivasan et al.
11,520,207 B2 12/2022 Brown et al.
11,520,907 B1 * 12/2022 Borowiec ............... G06F 3/067
11,546,360 B2 1/2023 Woodford et al.
11,556,659 B1 * 1/2023 Kumar .................. G06F 21/602
11,558,401 B1 1/2023 Vashisht et al.
11,558,414 B1 1/2023 Nguyen
11,558,423 B2 1/2023 Gordon et al.
11,567,751 B2 1/2023 Cosentino et al.
11,570,090 B2 1/2023 Shen et al.
11,575,696 B1 2/2023 Ithal et al.
11,593,485 B1 2/2023 Briliauskas et al.
11,606,378 B1 3/2023 Delpont et al.
11,614,956 B2 * 3/2023 Tsirkin .................. G06F 21/602
713/193
11,645,390 B2 5/2023 Vijayvargiya et al.
11,651,055 B2 5/2023 Saillet et al.
11,662,928 B1 * 5/2023 Kumar ................ G06F 11/1458
713/150
11,663,340 B2 5/2023 Wu et al.
11,669,386 B1 6/2023 Abrol
11,695,785 B2 7/2023 Ithal et al.
11,700,233 B2 7/2023 St. Pierre
11,706,252 B1 7/2023 Gabay et al.
11,711,374 B2 7/2023 Ross et al.

(56) References Cited

U.S. PATENT DOCUMENTS 11,720,685 B2 8/2023 Gwilliams
11,750,566 B1 * 9/2023 Montilla Lugo ..... H04L 63/168 713/153
11,757,844 B2 9/2023 Xiao
11,770,398 B1 9/2023 Erlingsson
11,792,284 B1 10/2023 Nanduri
11,799,874 B1 10/2023 Lichtenstein et al.
11,803,766 B1 10/2023 Srinivasan
11,831,670 B1 11/2023 Molls et al.
11,836,250 B2 12/2023 Grossman et al.
11,841,945 B1 12/2023 Fogel et al.
11,902,282 B2 2/2024 Ghiold et al.
11,914,707 B1 * 2/2024 Ramanathan ......... H04L 9/3247
11,922,220 B2 3/2024 Haghighat et al.
11,936,785 B1 3/2024 Shemesh et al.
11,960,609 B2 4/2024 Gokhman et al.
11,973,770 B1 4/2024 Miran et al.
11,991,216 B1 5/2024 Venkatachari
12,003,541 B2 6/2024 Shulman et al.
12,008,222 B1 6/2024 Niv et al.
12,010,127 B1 6/2024 Niv et al.
12,019,770 B2 * 6/2024 Nilsson ................... G06F 21/62
12,021,901 B2 6/2024 Gavish et al.
12,063,305 B2 8/2024 Ip et al.
12,164,652 B1 12/2024 Li et al.
12,166,785 B2 12/2024 Yellapragada et al.
12,212,586 B2 1/2025 Shemesh et al.
12,219,048 B1 2/2025 Shemesh et al.
12,244,627 B2 3/2025 Lidgi et al.
12,267,326 B2 4/2025 Lidgi et al.
12,278,825 B2 4/2025 Fogel et al.
12,395,488 B2 8/2025 Lidgi et al.
12,437,080 B2 10/2025 Dodge et al.
12,495,066 B2 12/2025 Kwon et al.
12,500,920 B2 12/2025 Crabtree et al.
12,506,755 B2 12/2025 Lidgi et al.
12,537,837 B2 1/2026 Reed et al.
2002/0133586 A1 9/2002 Shanklin et al.
2002/0184486 A1 12/2002 Kershenbaum et al.
2003/0188194 A1 10/2003 Currie et al.
2003/0217039 A1 11/2003 Kurtz et al.
2004/0054681 A1 3/2004 Pitts
2004/0103278 A1 5/2004 Abhishek et al.
2005/0050365 A1 3/2005 Seki et al.
2005/0071630 A1 3/2005 Thornton et al.
2005/0251863 A1 11/2005 Sima
2005/0283645 A1 12/2005 Turner et al.
2007/0006304 A1 1/2007 Kramer et al.
2007/0174915 A1 7/2007 Gribble et al.
2007/0271360 A1 11/2007 Sahita et al.
2008/0075283 A1 3/2008 Takahashi
2008/0104588 A1 5/2008 Barber et al.
2008/0221833 A1 9/2008 Brown et al.
2008/0307020 A1 12/2008 Ko et al.
2008/0320594 A1 12/2008 Jiang
2009/0031143 A1 * 1/2009 Hodzic .................. G06F 21/72 713/193
2009/0106256 A1 4/2009 Safari et al.
2009/0271863 A1 10/2009 Govindavajhala et al.
2010/0192201 A1 7/2010 Shimoni et al.
2010/0242082 A1 9/2010 Keene et al.
2010/0263049 A1 10/2010 Cross et al.
2010/0274970 A1 10/2010 Treuhaft et al.
2010/0281275 A1 11/2010 Lee et al.
2011/0035802 A1 2/2011 Arajujo, Jr. et al.
2011/0055361 A1 3/2011 Dehaan
2011/0247071 A1 10/2011 Hooks et al.
2011/0276806 A1 11/2011 Casper et al.
2012/0110574 A1 5/2012 Kumar
2012/0110651 A1 5/2012 Van Biljon et al.
2012/0255003 A1 10/2012 Sallam
2012/0297206 A1 11/2012 Nord et al.
2012/0311696 A1 12/2012 Datsenko et al.
2013/0024940 A1 1/2013 Hutchins et al.
2013/0054890 A1 2/2013 Desai et al.
2013/0124669 A1 5/2013 Anderson et al.
2013/0160119 A1 6/2013 Sartin
2013/0160129 A1 6/2013 Sartin
2013/0290708 A1 10/2013 Diaz et al.
2014/0096134 A1 4/2014 Barak
2014/0115578 A1 4/2014 Cooper et al.
2014/0237537 A1 8/2014 Manmohan
2014/0259092 A1 9/2014 Boucher et al.
2014/0317677 A1 10/2014 Vaidya
2014/0325170 A1 10/2014 Aswathanarayana et al.
2014/0337613 A1 11/2014 Martini
2015/0033305 A1 1/2015 Shear
2015/0055647 A1 2/2015 Roberts
2015/0058993 A1 2/2015 Choi et al.
2015/0067850 A1 3/2015 Baikalov
2015/0095995 A1 4/2015 Bhalerao
2015/0150072 A1 5/2015 Doctor et al.
2015/0161394 A1 6/2015 Ferragut et al.
2015/0163192 A1 6/2015 Jain
2015/0172321 A1 6/2015 Kirti et al.
2015/0199531 A1 7/2015 Ismael et al.
2015/0254364 A1 9/2015 Piduri et al.
2015/0304302 A1 10/2015 Zhang et al.
2015/0310215 A1 10/2015 McBride et al.
2015/0319160 A1 11/2015 Ferguson et al.
2015/0341359 A1 11/2015 Yang et al.
2016/0063037 A1 3/2016 Savkli
2016/0063466 A1 3/2016 Sheridan et al.
2016/0078231 A1 3/2016 Bach et al.
2016/0103669 A1 4/2016 Gamage et al.
2016/0105454 A1 4/2016 Li
2016/0140352 A1 5/2016 Nickolov
2016/0156664 A1 6/2016 Nagaratnam
2016/0224600 A1 8/2016 Munk
2016/0266800 A1 9/2016 Klee et al.
2016/0299708 A1 10/2016 Yang et al.
2016/0366185 A1 12/2016 Lee et al.
2017/0026416 A1 1/2017 Carpenter et al.
2017/0026419 A1 1/2017 Martini et al.
2017/0034198 A1 2/2017 Powers et al.
2017/0060483 A1 3/2017 Klee et al.
2017/0070506 A1 3/2017 Reddy
2017/0104755 A1 4/2017 Arregoces
2017/0111384 A1 4/2017 Loureiro et al.
2017/0126712 A1 5/2017 Crabtree et al.
2017/0163650 A1 6/2017 Seigel et al.
2017/0180421 A1 6/2017 Shieh et al.
2017/0181015 A1 6/2017 Ngo et al.
2017/0185784 A1 6/2017 Madou
2017/0187686 A1 6/2017 Shaikh et al.
2017/0187743 A1 6/2017 Madou
2017/0200122 A1 7/2017 Edson et al.
2017/0223024 A1 8/2017 Desai et al.
2017/0230179 A1 8/2017 Mannan et al.
2017/0237560 A1 8/2017 Mueller et al.
2017/0257347 A1 9/2017 Yan
2017/0285978 A1 10/2017 Manasse
2017/0300690 A1 10/2017 Ladnai et al.
2017/0374136 A1 12/2017 Ringdahl
2018/0004950 A1 1/2018 Gupta et al.
2018/0007087 A1 1/2018 Grady et al.
2018/0026995 A1 1/2018 Dufour et al.
2018/0027009 A1 1/2018 Santos
2018/0063290 A1 3/2018 Yang et al.
2018/0081640 A1 3/2018 Collins
2018/0083987 A1 3/2018 Kislitsin
2018/0101622 A1 4/2018 Helvik et al.
2018/0137174 A1 5/2018 Cahana et al.
2018/0150412 A1 5/2018 Manasse
2018/0159882 A1 6/2018 Brill
2018/0181310 A1 6/2018 Feinberg et al.
2018/0191726 A1 7/2018 Luukkala
2018/0198765 A1 7/2018 Maybee et al.
2018/0213002 A1 7/2018 Figovsky et al.
2018/0219888 A1 8/2018 Apostolopoulos
2018/0234459 A1 8/2018 Kung
2018/0239902 A1 8/2018 Godard
2018/0248902 A1 8/2018 Dânilã-Dumitrescu et al.
2018/0260566 A1 9/2018 Chaganti et al.

(56) References Cited

U.S. PATENT DOCUMENTS

2018/0270268 A1 9/2018 Gorodissky et al.
2018/0276084 A1 9/2018 Mitkar et al.
2018/0278639 A1 9/2018 Bernstein et al.
2018/0288129 A1 10/2018 Joshi et al.
2018/0307736 A1 10/2018 Balakrishnan et al.
2018/0309747 A1 10/2018 Sweet et al.
2018/0321993 A1 11/2018 McClory
2018/0341768 A1 11/2018 Marshall et al.
2018/0349612 A1 12/2018 Harel et al.
2018/0359058 A1 12/2018 Kurian
2018/0359059 A1 12/2018 Kurian
2018/0367548 A1 12/2018 Stokes, III et al.
2019/0007271 A1 1/2019 Rickards et al.
2019/0018961 A1 1/2019 Kostyushko et al.
2019/0043201 A1 2/2019 Strong et al.
2019/0058722 A1 2/2019 Levin et al.
2019/0068617 A1 2/2019 Coleman
2019/0068627 A1 2/2019 Thampy
2019/0081963 A1 3/2019 Waghorn
2019/0089720 A1 3/2019 Aditham et al.
2019/0095626 A1 3/2019 Mohan
2019/0104140 A1 4/2019 Gordeychik et al.
2019/0116111 A1 4/2019 Izard et al.
2019/0121986 A1 4/2019 Stopel et al.
2019/0132350 A1 5/2019 Smith et al.
2019/0149604 A1 5/2019 Jahr
2019/0166129 A1 5/2019 Gaetjen et al.
2019/0171811 A1 6/2019 Daniel et al.
2019/0191417 A1 6/2019 Baldemair et al.
2019/0205267 A1 7/2019 Richey et al.
2019/0207966 A1 7/2019 Vashisht et al.
2019/0220298 A1 7/2019 Jiao et al.
2019/0220575 A1 7/2019 Boudreau et al.
2019/0229915 A1 7/2019 Digiambattista et al.
2019/0235900 A1 8/2019 Singh et al.
2019/0236409 A1 8/2019 Van Der Stockt et al.
2019/0245883 A1 8/2019 Gorodissky et al.
2019/0260764 A1 8/2019 Humphrey et al.
2019/0266508 A1 8/2019 Bunyk et al.
2019/0268353 A1 8/2019 Ahuja et al.
2019/0278928 A1 9/2019 Rungta et al.
2019/0289035 A1 9/2019 Ahuja et al.
2019/0327258 A1 10/2019 Choi et al.
2019/0327271 A1 10/2019 Saxena et al.
2019/0334715 A1 10/2019 Gray
2019/0354675 A1 11/2019 Gan et al.
2019/0377988 A1 12/2019 Qi et al.
2020/0007314 A1 1/2020 Vouk et al.
2020/0007569 A1 1/2020 Dodge et al.
2020/0012659 A1 1/2020 Dageville et al.
2020/0012818 A1 1/2020 Levin et al.
2020/0019469 A1 1/2020 Khan et al.
2020/0021609 A1 1/2020 Kuppanna et al.
2020/0021994 A1 1/2020 Ranjbar et al.
2020/0028862 A1 1/2020 Lin
2020/0044916 A1 2/2020 Kaufman et al.
2020/0050440 A1 2/2020 Chuppala et al.
2020/0074360 A1 3/2020 Humphries et al.
2020/0082094 A1 3/2020 McAllister et al.
2020/0106782 A1 4/2020 Sion
2020/0117434 A1 4/2020 Biskup et al.
2020/0125352 A1 4/2020 Kannan
2020/0137097 A1 4/2020 Zimmermann et al.
2020/0137125 A1 4/2020 Patnala et al.
2020/0145405 A1 5/2020 Bosch et al.
2020/0162431 A1 5/2020 Goldschlag et al.
2020/0175171 A1 6/2020 Rieger et al.
2020/0183719 A1 6/2020 Shetty et al.
2020/0186416 A1 6/2020 Hashimoto et al.
2020/0244678 A1 7/2020 Shua
2020/0244692 A1 7/2020 Shua
2020/0259852 A1 8/2020 Wolff et al.
2020/0287927 A1 9/2020 Zadeh et al.
2020/0320189 A1 10/2020 Zhang et al.
2020/0320845 A1 10/2020 Livny et al.
2020/0336489 A1 10/2020 Wuest et al.
2020/0364001 A1 11/2020 Bhandari et al.
2020/0382556 A1 12/2020 Woolward et al.
2020/0387357 A1 12/2020 Mathon et al.
2020/0389431 A1 12/2020 St. Pierre
2020/0389469 A1 12/2020 Litichever et al.
2020/0409741 A1 12/2020 Dornemann et al.
2021/0006574 A1 1/2021 Venter et al.
2021/0014265 A1 1/2021 Hadar et al.
2021/0026932 A1 1/2021 Boudreau et al.
2021/0034791 A1 2/2021 Singh et al.
2021/0042263 A1 2/2021 Zdornov et al.
2021/0056548 A1 2/2021 Monica et al.
2021/0089662 A1* 3/2021 Muniswamy-Reddy .................... H04L 63/166
2021/0105304 A1 4/2021 Kraning et al.
2021/0149788 A1 5/2021 Downie
2021/0158835 A1 5/2021 Hill et al.
2021/0168150 A1 6/2021 Ross et al.
2021/0173939 A1 6/2021 Kotler et al.
2021/0176123 A1 6/2021 Plamondon
2021/0176164 A1 6/2021 Kung et al.
2021/0185073 A1 6/2021 Ewaida et al.
2021/0194678 A1 6/2021 Schindewolf et al.
2021/0200881 A1 7/2021 Joshi et al.
2021/0203684 A1 7/2021 Maor et al.
2021/0203761 A1 7/2021 Ahn et al.
2021/0211453 A1 7/2021 Cooney
2021/0216591 A1 7/2021 Dvinov et al.
2021/0216630 A1* 7/2021 Karr .................... H04L 63/1416
2021/0218567 A1 7/2021 Richards et al.
2021/0226812 A1 7/2021 Park
2021/0226928 A1 7/2021 Crabtree et al.
2021/0232344 A1 7/2021 Corrie
2021/0234889 A1 7/2021 Burle et al.
2021/0243190 A1 8/2021 Bargury et al.
2021/0248443 A1 8/2021 Shu et al.
2021/0263802 A1 8/2021 Gottemukkula et al.
2021/0273953 A1 9/2021 Fellows et al.
2021/0286877 A1 9/2021 Vijayvargiya et al.
2021/0297447 A1 9/2021 Crabtree et al.
2021/0306377 A1 9/2021 Kundu et al.
2021/0306416 A1 9/2021 Mukhopadhyay et al.
2021/0314342 A1 10/2021 Oberg
2021/0320794 A1* 10/2021 Auh ........................ H04L 9/085
2021/0326883 A1 10/2021 Misra et al.
2021/0329019 A1 10/2021 Shua
2021/0334386 A1 10/2021 AlGhamdi et al.
2021/0357246 A1 11/2021 Kumar et al.
2021/0360032 A1 11/2021 Crabtree et al.
2021/0368045 A1 11/2021 Verma
2021/0377312 A1 12/2021 Biswas et al.
2021/0382995 A1* 12/2021 Massiglia ............. G06F 3/0659
2021/0382997 A1 12/2021 Yi et al.
2021/0400071 A1 12/2021 Ray et al.
2021/0406365 A1 12/2021 Neil et al.
2021/0409486 A1 12/2021 Martinez
2022/0004410 A1 1/2022 Chen
2022/0012771 A1 1/2022 Gustafson
2022/0027180 A1 1/2022 Katyal et al.
2022/0030020 A1 1/2022 Huffman
2022/0035862 A1 2/2022 Ben-Natan
2022/0035905 A1 2/2022 Lu et al.
2022/0036208 A1 2/2022 Rao et al.
2022/0036302 A1 2/2022 Cella et al.
2022/0053011 A1 2/2022 Rao et al.
2022/0060497 A1 2/2022 Crabtree et al.
2022/0086173 A1 3/2022 Yavo et al.
2022/0094713 A1 3/2022 Lee et al.
2022/0100869 A1 3/2022 Berger et al.
2022/0103441 A1 3/2022 Noro
2022/0124111 A1 4/2022 Johnson et al.
2022/0131844 A1 4/2022 Sherlock et al.
2022/0131888 A1 4/2022 Kanso
2022/0138512 A1 5/2022 Saillet et al.
2022/0156396 A1* 5/2022 Bednash ............... G06F 21/554
2022/0164111 A1 5/2022 Yang et al.
2022/0179809 A1 6/2022 Venkataramani et al.
2022/0179964 A1 6/2022 Qiao et al.

(56) References Cited

U.S. PATENT DOCUMENTS

2022/0182403 A1 6/2022 Mistry
2022/0188273 A1 6/2022 Koorapati et al.
2022/0188689 A1 6/2022 Gunawardana et al.
2022/0197926 A1 6/2022 Passey et al.
2022/0210053 A1 6/2022 Du
2022/0215101 A1 7/2022 Rioux et al.
2022/0232024 A1 7/2022 Kapoor
2022/0232042 A1 7/2022 Crabtree et al.
2022/0247791 A1 8/2022 Duminuco et al.
2022/0253389 A1 8/2022 Fay et al.
2022/0263656 A1* 8/2022 Moore .................. H04L 9/3215
2022/0284362 A1 9/2022 Bellinger et al.
2022/0309166 A1 9/2022 Shenoy et al.
2022/0326861 A1* 10/2022 Shachar ................ G06F 21/606
2022/0326941 A1 10/2022 Nelson et al.
2022/0327119 A1 10/2022 Gasper et al.
2022/0335340 A1 10/2022 Moustafa et al.
2022/0342690 A1 10/2022 Shua
2022/0342985 A1 10/2022 Alperovich et al.
2022/0342997 A1 10/2022 Watanabe et al.
2022/0345480 A1 10/2022 Shua
2022/0345481 A1 10/2022 Shua
2022/0350642 A1 11/2022 Poddar et al.
2022/0350931 A1 11/2022 Shua
2022/0357992 A1 11/2022 Karpovsky
2022/0358233 A1 11/2022 Thakur et al.
2022/0360958 A1 11/2022 Cui et al.
2022/0374519 A1 11/2022 Botelho et al.
2022/0382784 A1 12/2022 Osuala et al.
2022/0385668 A1 12/2022 Simonetti et al.
2022/0400128 A1 12/2022 Kfir et al.
2022/0407841 A1 12/2022 Karpowicz et al.
2022/0407889 A1 12/2022 Narigapalli et al.
2022/0413879 A1 12/2022 Passey et al.
2022/0414103 A1 12/2022 Upadhyay et al.
2022/0417011 A1 12/2022 Shua
2022/0417219 A1 12/2022 Sheriff
2023/0007014 A1 1/2023 Narayan
2023/0011957 A1 1/2023 Panse et al.
2023/0019015 A1 1/2023 Ahmed
2023/0027210 A1 1/2023 Shelton, IV et al.
2023/0032686 A1 2/2023 Williams et al.
2023/0036145 A1 2/2023 Ramachandran et al.
2023/0040635 A1 2/2023 Narayan
2023/0043336 A1 2/2023 Mitkar et al.
2023/0075355 A1 3/2023 Twigg et al.
2023/0087093 A1 3/2023 Ithal et al.
2023/0093527 A1 3/2023 Shua
2023/0095756 A1 3/2023 Wilkinson et al.
2023/0102103 A1 3/2023 Mazumder et al.
2023/0110080 A1 4/2023 Hen et al.
2023/0111795 A1 4/2023 Palanisamy et al.
2023/0114821 A1 4/2023 Thomas et al.
2023/0123477 A1 4/2023 Luttwak et al.
2023/0125134 A1 4/2023 Raleigh et al.
2023/0134674 A1 5/2023 Quinn et al.
2023/0135240 A1 5/2023 Cody et al.
2023/0136839 A1 5/2023 Sundararajan et al.
2023/0155984 A1 5/2023 Adam et al.
2023/0161614 A1 5/2023 Herzberg et al.
2023/0161870 A1 5/2023 Herzberg et al.
2023/0164148 A1 5/2023 Narayan
2023/0164164 A1 5/2023 Herzberg et al.
2023/0164182 A1 5/2023 Kothari et al.
2023/0169165 A1 6/2023 Williams et al.
2023/0171271 A1 6/2023 Williams et al.
2023/0192418 A1 6/2023 Horowitz et al.
2023/0208855 A1 6/2023 Sheriff et al.
2023/0208870 A1 6/2023 Yellapragada et al.
2023/0224319 A1 7/2023 Isoyama et al.
2023/0229764 A1 7/2023 Vohra et al.
2023/0231867 A1 7/2023 Rampura Venkatachar
2023/0237068 A1 7/2023 Sillifant et al.
2023/0254284 A1 8/2023 McCord
2023/0254330 A1 8/2023 Singh
2023/0297666 A1 9/2023 Atamli et al.
2023/0325814 A1* 10/2023 Vijayan .............. G06Q 20/3829
705/66
2023/0336550 A1 10/2023 Lidgi et al.
2023/0336578 A1 10/2023 Lidgi et al.
2023/0376586 A1 11/2023 Shemesh et al.
2024/0007492 A1 1/2024 Shen et al.
2024/0015184 A1 1/2024 Vijayvargiya et al.
2024/0037229 A1 2/2024 Pabón et al.
2024/0039927 A1 2/2024 Narayan et al.
2024/0045838 A1 2/2024 Reiss et al.
2024/0073115 A1 2/2024 Chakraborty et al.
2024/0080329 A1 3/2024 Reed et al.
2024/0080332 A1 3/2024 Ganesh et al.
2024/0146818 A1 5/2024 Cody et al.
2024/0179169 A1 5/2024 Seveloff et al.
2024/0202359 A1 6/2024 Shukla et al.
2024/0259396 A1 8/2024 Kerkar et al.
2024/0370880 A1 11/2024 Jeske et al.
2024/0396894 A1 11/2024 Fisher et al.
2025/0055870 A1 2/2025 Viswambharan et al.
2025/0086280 A1 3/2025 Murphy et al.
2025/0202898 A1 6/2025 Lidgi et al.
2025/0328373 A1 10/2025 Shua
2025/0363220 A1 11/2025 Kotler et al.

FOREIGN PATENT DOCUMENTS

CN 112989379 A 6/2021
EP 4160983 A1 4/2023
EP 4254869 A2 10/2023
JP 2017120492 A 7/2017
RU 2421792 C2 6/2011
SG 10202009702X 4/2021
SG 11202103226 U 4/2021
WO 2004034184 A2 4/2004

OTHER PUBLICATIONS

Alomari, Mohammad Ahmed et al. A Study on Encryption Algorithms and Modes for Disk Encryption. 2009 International Conference on Signal Processing Systems. https://ieeexplore.ieee.org/stamp/stamp.jsp?tp=&arnumber=5166897 (Year: 2009).*

Mrdovic, Sasa; Huseinovic, Alvin. Forensic analysis of encrypted volumes using hibernation file. 2011 19th Telecommunications Forum (TELFOR) Proceedings of Papers. https://ieeexplore.ieee.org/stamp/stamp.jsp?tp=&arnumber=6143785 (Year: 2011).*

Liang, Min; Chang, Chao-wen. Research and design of full disk encryption based on virtual machine. 2010 3rd International Conference on Computer Science and Information Technology. https://ieeexplore.ieee.org/stamp/stamp.jsp?tp=&arnumber=5565144 (Year: 2010).*

Ali Gholami; Security and Privacy of Sensitive Data in Cloud Computing: a Survey of Recent Developments; ARIX:2016; pp. 131-150.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

(56) References Cited

OTHER PUBLICATIONS

International Search Report of PCT/IB2023/058074, dated Nov. 20, 2023. Searching Authority United States Patent and Trademark Office, Alexandria, Virginia.
International Search Report, PCT/IB23/55312. ISA/US, Commissioner for Patents, Alexandria, Virginia. Dated Aug. 30, 2023.
Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/ stamp.jsp?tp=&arnumber=9014355 (Year: 2019).
Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).
Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).
Leibenger, Dominik et al. EncFS goes multi-user: Adding access control to an encrypted file system. 2016 IEEE Conference on Communications and Network Security (CNS). https://ieeexoplore.ieee.org/stamp/stamp.jsp?tp=&arnumber=7860544 (Year: 2016).
Microsoft Build. "Introduction to Azure managed disks". Aug. 21, 2023, https://docs.microsoft.com/en-us/azure/virtual-machines/managed-disks-overview.
Microsoft Docs. "Create a VM from a managed image". Article. Jan. 5, 2022. https://docs.microsoft.com/en-us/azure/virtual-machines/windows/create-vm-generalized-managed.
Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).
No stated author; Downdetector; 2020; retrieved from the Internet https://web.archive.org/web/20201226001244/https://downdetector.com/; pp. 1-8, as printed. (Year: 2020).
No stated author; How to Run a Ping Test (Windows) 2020; retrieved from the Internet https://web.archive.org/web/20200811194856/https://support.shaw.ca/t5/internet-articles/how-to-run-a-ping-test-windows/ta-p/6677; pp. 1-6 as printed. (Year: 2020).
No stated author; IsltoownRightNow; 2020; retrieved from the Internet https://web.archive.org/web/20201202121557/https://www.isitdownrightnow.com/; pp. 1-2 as printed. (Year: 2020).
Safaryan, Olga A et al. Cryptographic Algorithm Implementation for Data Encryption in DBMS MS SQL Server. 2020 IEEE East-West Design & Test Symposium (EWDTS). https://ieeexplore.ieee.org/stamp/stamp.jsp?tp=&arnumber=9224775 (Year: 2020).
Sahil Suneja; Safe Inspection of Live Virtual Machines; IEEE; Year:2017; pp. 97-111.
Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).
Siqi Ma; Certified Copy? Understanding Security Risks of Wi-Fi Hotspot based Android Data Clone Services; ACM; Year: 2021; pp. 320-331.
Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/stamp.jsp?tp=&arnumber=9250645 (Year: 2020).
Written Opinion of the International Searching Authority for PCT Application No. PCT/IB2022/060940 dated Feb. 1, 2023. The International Bureau of WIPO.
Written Opinion of the International Searching Authority, PCT/IB23/55312. ISA/US Commissioner for Patents, Alexandria, Virginia. Dated Aug. 30, 2023.
Written Opinion of the Searching Authority for PCT/IB2023/050848, dated May 9, 2023. International Bureau of WIPO.
Written Opinion of the Searching Authority of PCT/IB2023/058074, dated Nov. 20, 2023. Searching Authority United States Patent and Trademark Office, Alexandria, Virginia.
Zhang et al. BMC Bioinformatics 2014. "On finding bicliques in bipartite graphs: a novel algorithm and its application to the integration of diverse biological data types". http://www.biomedcentral.com/1471-2105/15/110.
Bringhenti Daniele et al: "A novel approach for security function graph configuration and deployment", 2021 IEEE 7th International Conference on Network Softwarization (Netsoft), IEEE, Jun. 28, 2021 (Jun. 28, 2021), pp. 457-463, XP033948302, DOI: 10.1109/NETSOFT51509.2021.9492654 [retrieved on Jul. 20, 2021] * abstract * * Sections I-III *.
Espinha Gasiba Tiago Tiago Gasiba@Siemens Com et al: "Raising Security Awareness of Cloud Deployments using Infrastructure as\ Code through CyberSecurity Challenges", Proceedings of the 1st Conference on Mile-High Video, ACMPUB27, New York, NY, USA, Aug. 17, 2021 (Aug. 17, 2021), pp. 1-8, XP058860050, DOI: 10.1145/3465481.3470030 ISBN: 978-1-4503-9606-6 * abstract * * Sections 1-3 *.
Extended European Search Report and Opinion for EP 22898020.7, dated Sep. 9, 2025. European Patent Office, Munich, Germany.
Lin et al., "A Large-scale Data Set and an Empirical Study of Docker Images Hosted on Docker Hub", 2020, IEEE International Conference on Software Maintenance and Evolution (ICSME), pp. 371-381. (Year: 2020).
European Search Report and Opinion for EP application 23811275.9, dated Sep. 25, 2025. European Patent Office, Munich, Germany.
AWS, AWS managed policies for job functions, Oct. 26, 2021, https://web.archive.org/web/20211026212847/https://docs.aws.amazon.com/IAM/latesUUserGuide/access_policiesjob-functions.html (Year: 2021).
Christie Koehler, Detecting and Managing Drift with Terraform, Jun. 7, 2018, https://www.hashicorp.com/en/blog/detecting-and-managing-drift-with-terraform (Year: 2018).
Extended European Search Report for EP 23746586.9 dated Jul. 23, 2025. European Patent Office, Munich, Germany.
Github, Complete EC2 Instance, Aug. 27, 2021, https://github.com/terraform-aws-modules/terraform-aws-ec2-instance/tree/528613d4580f2c1266e87d8d24fc25bf5290fe2c/examples/complete (Year: 2021).
Github, Complete EC2 Instance, Aug. 27, 2021, https://github.com/terraform-aws-modules/terraform-aws-ec2-instance/tree/528613d4580f2c1266e87d8d24fc25bf5290fe2c/examples/complete/main.tf (Year: 2021).
Google, Shift security left with on-demand vulnerability scanning, Aug. 25, 2021 https://cloud.google.com/blog/products/ identity-security/scan-for-vulnerabilities-early-to-shift-security-left-in-cicd (Year: 2021).
Proxify, Mastering good programming practices: A comprehensive guide, Apr. 27, 2021, https://proxify.io/articles/good-programming-practices (Year: 2021).
Reddit, 1AM Roles for each Lambda?, Aug. 25, 2019 (Year: 2019).
"Layer 2—Data Link." OSI Explain, https://osiexplain.com/layer2_datalink.html. Accessed Jun. 3, 2026.
Calvin KO Execution Monitoring of Security-Critical Programs in Distributed Systems: A Specification-based Approach; IEEE: 1999; pp. 175-187.
Communication pursuant to Article 94(3) EPC for EP application No. 23746586.9, dated Jun. 11, 2026. European Patent Office, Munich, Germany.
Duc C. Le; Analyzing Data Granularity Levels for Insider Threat Detection Using Machine Leaming; IEEE; 2021; pp. 30-44.
CopySnapshot Amazon Elastic Compute Cloud—Published Oct. 20, 2021 (Year: 2021).
Decrypt AWS Key Management Service Published Oct. 27, 2021 (Year: 2021).
How to share encrypted AMIs across accounts to launch encrypted EC2 instances Published May 13, 2019 (Year: 2019).

* cited by examiner

TECHNIQUES FOR CIRCUMVENTING PROVIDER-IMPOSED LIMITATIONS IN SNAPSHOT INSPECTION OF DISKS FOR CYBERSECURITY

CROSS-REFERENCE TO RELATED APPLICATIONS

This application is a continuation of U.S. patent application Ser. No. 18/649,529, filed Apr. 29, 2024, which itself is a continuation of U.S. patent application Ser. No. 18/359,493 filed Jul. 26, 2023, which is a continuation-in-part of U.S. patent application Ser. No. 18/146,074 filed on Dec. 23, 2022, and a continuation-in-part of U.S. patent application Ser. No. 18/146,076 filed on Dec. 23, 2022, both of which claim the benefit of U.S. Provisional Patent Application No. 63/266,031 filed on Dec. 27, 2021. All contents of the preceding applications are hereby incorporated by reference.

TECHNICAL FIELD

The present disclosure relates generally to cybersecurity threat detection, and specifically to inspection of encrypted disks during threat detection.

BACKGROUND

Cybersecurity threats are ever present in cloud computing environments and often leave traces, indicators, and the like, on a disk, storage space, memory, etc., of the workload with which they are associated. For example, a cybersecurity threat can be a misconfiguration, a vulnerability, an exposure, a weak secret, an exposed password, an out of date software application, and the like.

Scanning for cybersecurity threats in a cloud computing environment often includes scanning storage, disks, and the like, for such cybersecurity objects. One method of protecting information includes encrypting storage resources, such as disks, so that even if they are accessed by an unauthorized party, the disk is not readable. However, such encrypted disks also cannot be scanned as a scanner requires an unencrypted volume to access. Encrypted disks present a challenge as decryption keys may not be readily available, and therefore their contents cannot be scanned.

Encryption of disks can be performed at application level, on a cloud platform level, or both. A scanner therefore cannot readily access the information on the disk, or determine what is present on it.

Further complicating matters, certain actions utilized by cloud computing infrastructures, such as Amazon® Web Services (AWS) are restricted, for example to a certain number of operations for a given time frame. Such actions which are utilized in the process of detecting cybersecurity threats pose a severe bottleneck.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include detecting an encrypted disk in a cloud computing environment, the encrypted disk encrypted utilizing a first key in a key management system (KMS). The method may also include generating a second key in the KMS, the second key providing access for a principal of an inspection environment. The method may furthermore include generating a snapshot of the encrypted disk. The method may in addition include generating a volume based on the snapshot, where the volume is re-encrypted with the second key. The method may moreover include generating a snapshot of the re-encrypted volume. The method may also include generating an inspectable disk from the snapshot of the re-encrypted volume. The method may furthermore include initiating inspection for a cybersecurity object on the inspectable disk. Other embodiments of this aspect include corresponding computer systems, apparatus, and computer programs recorded on one or more computer storage devices, each configured to perform the actions of the methods.

Implementations may include one or more of the following features. The method may include: determining that the encrypted disk is encrypted based on metadata associated with the encrypted disk. The method may include: associating the second key with a principal of an inspection environment. The method may include: inspecting the inspectable disk for any one of: a file, a text, a regular expression (regex), a secret, a key, a certificate, a virtual workload, and any combination thereof. The method may include: generating the second key utilizing any instruction of: kms:CreateGrant, kms:CreatKey, kms:PutKeyPolicy, and any combination thereof. The method may include: generating volume utilizing any instruction of: kms:ReEncryptFrom, kms:ReEncryptTo, and any combination thereof. The method may include: generating a decrypted inspectable disk, based on the second key. In an embodiment, the generated snapshot is encrypted with the first key. Implementations of the described techniques may include hardware, a method or process, or a computer tangible medium.

In one general aspect, non-transitory computer-readable medium may include one or more instructions that, when executed by one or more processing circuitry of a device, cause the device to: detect an encrypted disk in a cloud computing environment, the encrypted disk encrypted utilizing a first key in a key management system (KMS). The medium may furthermore generate a second key in the KMS, the second key providing access for a principal of an inspection environment. The medium may in addition generate a snapshot of the encrypted disk. The medium. The medium may moreover generate a volume based on the snapshot, where the volume is re-encrypted with the second key. The medium may also generate a snapshot of the re-encrypted volume. The medium may furthermore generate an inspectable disk from the snapshot of the re-encrypted volume. The medium may in addition initiate inspection for a cybersecurity object on the inspectable disk. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect an encrypted disk in a cloud computing environment, the encrypted disk encrypted utilizing a first key in a key management system (KMS). The system may in addition generate a second key in the KMS, the second key providing access for a principal of an inspection environment. The system may moreover generate a snapshot of the encrypted disk. The system may also generate a volume based on the snapshot, where the volume is re-encrypted with the second key. The system may furthermore generate a snapshot of the re-encrypted volume. The system may in addition generate an inspectable disk from the snapshot of the re-encrypted volume. The system may moreover initiate inspection for a cybersecurity object on the inspectable disk. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: determine that the encrypted disk is encrypted based on metadata associated with the encrypted disk. The system where the memory contains further instructions which when executed by the processing circuitry further configure the system to: associate the second key with a principal of an inspection environment. The system where the memory contains further instructions which when executed by the processing circuitry further configure the system to: inspect the inspectable disk for any one of: a file, a text, a regular expression (regex), a secret, a key, a certificate, a virtual workload, and any combination thereof. The system where the memory contains further instructions which when executed by the processing circuitry further configure the system to: generate the second key utilizing any instruction of: kms:CreateGrant, kms:CreatKey, kms:PutKeyPolicy, and any combination thereof. The system where the memory contains further instructions which when executed by the processing circuitry further configure the system to: generate the volume utilizing any instruction of: kms:ReEncryptFrom, kms:ReEncryptTo, and any combination thereof. The system where the memory contains further instructions which when executed by the processing circuitry further configure the system to: generate a decrypted inspectable disk, based on the second key. The system where the generated snapshot is encrypted with the first key. Implementations of the described techniques may include hardware, a method or process, or a computer tangible medium.

In one general aspect, a method may include detecting an encrypted disk in a computing environment, the encrypted disk utilizing a first key in a key management system (KMS) for decryption. The method may also include generating a second key for decryption in the KMS, the second key associated with an entity of an inspection environment. The method may furthermore include generating a snapshot of the encrypted disk. The method may in addition include generating a volume based on the snapshot. The method may moreover include re-encrypting the volume with the second key. The method may also include generating an inspectable disk from the re-encrypted volume. The method may furthermore include initiating inspection for a cybersecurity object on the inspectable disk. Other embodiments of this aspect include corresponding computer systems, apparatus, and computer programs recorded on one or more computer storage devices, each configured to perform the actions of the methods.

Implementations may include one or more of the following features. The method may include: generating a snapshot of the re-encrypted volume; and generating the inspectable disk based on the generated snapshot of the re-encrypted volume. The method may include: generating a cloned disk based on the re-encrypted volume; and generating the inspectable disk based on the cloned disk. The method may include: generating the second key in response to determining that a policy associated with the first key forbids granting access to the first key for the inspection environment. The method may include: detecting metadata associated with the encrypted disk; and determining that the encrypted disk is encrypted based on the detected metadata. The method may include: associating the second key with a principal of the inspection environment. The method may include: inspecting the inspectable disk for any one of: a file, a text, a regular expression (regex), a secret, a key, a certificate, a virtual workload, and any combination thereof. The method may include: generating the second key utilizing any instruction of: kms:CreateGrant, kms:CreateKey, kms:PutKeyPolicy, and any combination thereof. The method may include: generating the volume utilizing any instruction of: kms:ReEncryptFrom, kms:ReEncryptTo, and any combination thereof. The method may include: generating a decrypted inspectable disk, based on the second key. The method where the generated snapshot is encrypted with the first key. Implementations of the described techniques may include hardware, a method or process, or a computer tangible medium.

In one general aspect, non-transitory computer-readable medium may include one or more instructions that, when executed by one or more processing circuitry of a device, cause the device to: detect an encrypted disk in a computing environment, the encrypted disk utilizing a first key in a key management system (KMS) for decryption; generate a second key for decryption in the KMS, the second key associated with an entity of an inspection environment; generate a snapshot of the encrypted disk; generate a volume based on the snapshot; re-encrypt the volume with the second key; generate an inspectable disk from the re-encrypted volume; and initiate inspection for a cybersecurity object on the inspectable disk. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect an encrypted disk in a computing environment, the encrypted disk utilizing a first key in a key management system (KMS) for decryption. The system may in addition generate a second key for decryption in the KMS, the second key associated with an entity of an inspection environment. The system may moreover generate a snapshot of the encrypted disk. The system may also generate a volume based on the snapshot. The system may furthermore re-encrypt the volume with the second key. The system may in addition generate an inspectable disk from the re-encrypted volume. The system may moreover initiate inspection for a cybersecurity object on the inspectable disk. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: generate a snapshot of the re-encrypted volume; and generate the inspectable disk based on the generated snapshot of the re-encrypted volume. The system where the memory contains further instructions which when executed by the processing circuitry further configure the system to: generate a cloned disk based on the re-encrypted volume; and generate the inspectable disk based on the cloned disk. The system where the memory contains further instructions which when executed by the processing circuitry further configure the system to: generate the second key in response to determining that a policy associated with the first key forbids granting access to the first key for the inspection environment. The system where the memory contains further instructions which when executed by the processing circuitry further configure the system to: detect metadata associated with the encrypted disk; and determine that the encrypted disk is encrypted based on the detected metadata. The system where the memory contains further instructions which when executed by the processing circuitry further configure the system to: associate the second key with a principal of the inspection environment. The system where the memory contains further instructions which when executed by the processing circuitry further configure the system to: inspect the inspectable disk for any one of: a file, a text, a regular expression (regex), a secret, a key, a certificate, a virtual workload, and any combination thereof. The system where the memory contains further instructions which when executed by the processing circuitry further configure the system to: generate the second key utilizing any instruction of: generate the second key utilizing any instruction of: CreateGrant, kms: CreateKey, kms:PutKeyPolicy, and any combination thereof. The system where the memory contains further instructions which when executed by the processing circuitry further configure the system to: generate the volume utilizing any instruction of: generate the volume utilizing any instruction of: ReEncryptFrom, kms:ReEncryptTo, and any combination thereof. The system where the memory contains further instructions which when executed by the processing circuitry further configure the system to: generate a decrypted inspectable disk, based on the second key. The system where the generated snapshot is encrypted with the first key. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
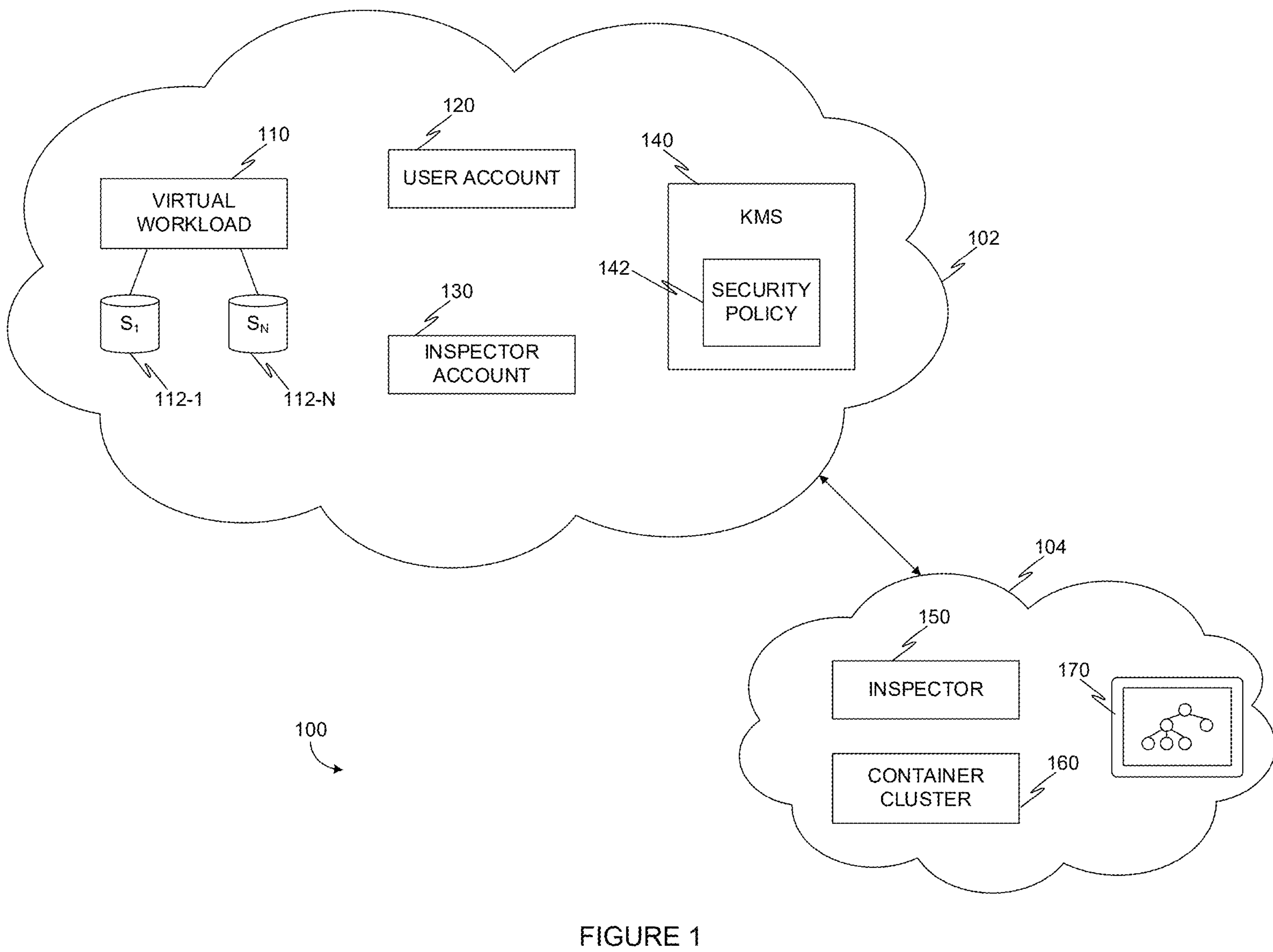
FIG. 1 is a schematic illustration of a network diagram of a production cloud environment and an inspecting cloud environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for reducing use of snapshot copy operations in cybersecurity inspection, is disclosed. In some embodiments, operations such as CopySnapshot in an Amazon® Web Services (AWS) environment are limited, restricted, and the like, for example, to a certain number of operations in a given time frame, to a given number of concurrent operations of a first type, a combination thereof, and the like. It is therefore advantageous to provide an alternate method to reduce use of limited operations, as these are a bottleneck for inspecting workloads in a computing environment.

FIG. 1 is an example schematic illustration of a network diagram 100 of a production cloud environment and an inspecting cloud environment, utilized to describe an embodiment. In an embodiment, a production cloud environment 102 includes a plurality of principals, such as user account 120, and a plurality of virtual resources, such as virtual workload 110. In some embodiments, a cloud environment is implemented utilizing a cloud computing infrastructure, such as Amazon® Web Services (AWS), Microsoft® Azure, or Google® Cloud Platform (GCP). Storage may be implemented, for example using S3 in AWS.

In an embodiment, a virtual resource is a cloud entity which provides a service, access to a service, provisioning of hardware, and the like, such as a virtual machine, a software container, a serverless function, and the like. In certain embodiments, a principal is a cloud entity which is authorized to act on a resource. For example, according to an embodiment, a principal is a user account, a service account, a role, a combination thereof, and the like.

In some embodiments, the virtual workload 110 is connected a storage disk, a plurality of storage disks, and the like, such as storage disks 112-1 through 112-N, where 'N' is an integer having a value of '2' or greater. In some embodiments, the storage disk is provisioned as a virtual disk, as a block address on a block storage, and the like. For example, a block storage is a Simple Storage Service (S3®), according to an embodiment.

In an embodiment, a user account 120 includes unique identifiers, such as email address, username, password, combinations thereof, and the like. A user account is managed by an identity and access management (IAM) service in a cloud environment, according to an embodiment. The IAM service further controls (i.e., defines authorizations, policies, rules, and the like, for) user groups, user roles, permissions, service accounts, and the like, in some embodiments.

In some embodiments an inspector account 130 is deployed in the production environment 102, and is implemented, for example as a user account, a service account, and the like. The inspector account is authorized to communicate with various components of the cloud environment 102 and further communicate with an inspecting cloud environment 104, according to some embodiments.

In certain embodiments, the inspector account 130 is configured to communicate with a key management service (KMS) 140. The KMS 140 is implemented as a virtual workload, a plurality of virtual workloads, and the like, in the production cloud environment 102, according to an embodiment. In some embodiments the KMS 140 is deployed on the cloud computing infrastructure on which the production environment 102 is deployed.

A KMS 140 is configured to store therein keys which are used to access encrypted resources in the production cloud environment 102, such as encrypted disks, encrypted files, and the like, according to an embodiment. The KMS 140 further includes a security policy engine 142, which is configured to associate a security policy with at least a portion of the keys stored in the KMS 140, according to an embodiment. In certain embodiments, a security policy indicates what user accounts are authorized to use a key managed by the KMS 140.

In an embodiment, the inspecting cloud environment 104 is configured to receive information from the production cloud environment 102 and is further configured to detect cybersecurity risks in the production cloud environment 102. In some embodiments, the inspecting cloud environment 104 includes a plurality of inspectors, such as inspector 150, which are each configured to detect a cybersecurity object. A cybersecurity object is, according to an embodiment, a secret, an application, a key, a certificate, a malware, a password, a combination thereof, and the like.

In certain embodiments, the inspector 150 is implemented as a virtual workload, such as a serverless function, deployed in the inspecting cloud environment 104. An inspector 150 is configured to receive information originating from the cloud production environment 102, in some embodiments, and is further configured to inspect the information to discover predefined data objects (i.e., cybersecurity objects) therein.

In an embodiment, the inspecting cloud environment 104 further includes a software container cluster, such as software container cluster 160. The software container cluster 160 is implemented for example utilizing a Kubernetes® (stylized as K8s) application, according to an embodiment. In certain embodiments, each cluster 160 includes a plurality of nodes.

For example, in an embodiment, an inspectable disk is generated based on the disk 112-1 in order to inspect the contents of the disk 112-1. In an embodiment, the inspectable disk is generated based on a snapshot, a clone, a copy, a combination thereof, and the like, of the disk 112-1. In certain embodiments, access to the inspectable disk is provided to the inspector 150 via the inspector account 130. For example, the inspector 150 is configured, in an embodiment, to utilize a service account (e.g., the inspector account 130) to access the inspectable disk and perform operations thereon, such as a read operation to access the contents of the inspectable disk.

In an embodiment, the software container cluster 160 is configured to provision a storage resource attached to a container, for example as a volume which is generated based on the inspectable disk. In certain embodiments, an inspector 150 is configured to access to the volume, and inspect the volume for a cybersecurity object. In an embodiment a plurality of inspectors are configured to each access the volume generated from the inspectable disk. Inspecting the inspectable disk in place of the disk 112-1 in the production environment allows the production environment to continue its operation with minimal interference, while inspecting the contents of the disk 112-1 without disrupting operation in the production environment.

Figure 2:
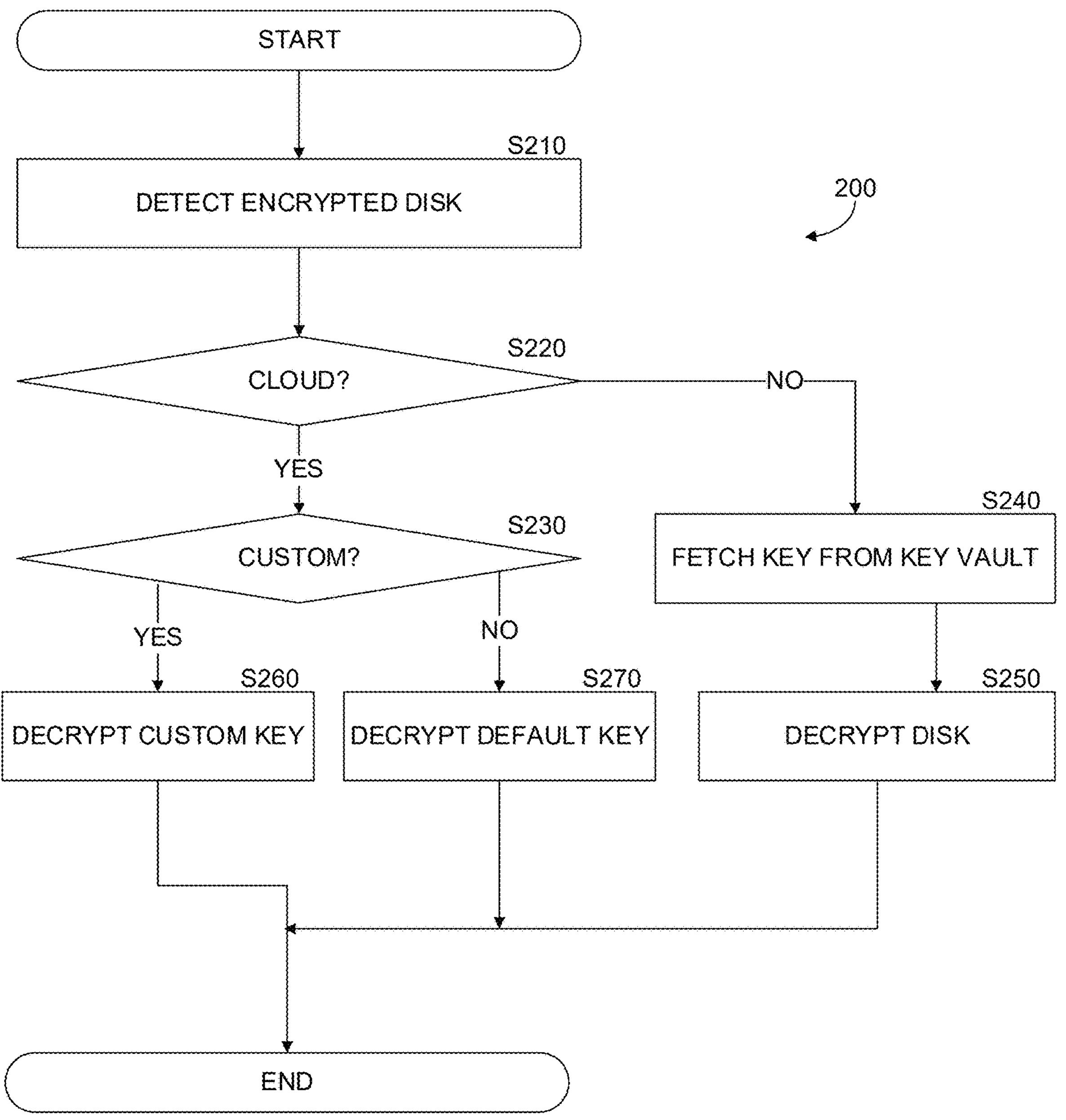
FIG. 2 is a flowchart of a method for inspecting encrypted disks of workloads in a cloud environment, implemented according to an embodiment.

FIG. 2 is an example flowchart 200 of a method for inspecting encrypted disks of workloads in a cloud environment, implemented according to an embodiment. In some embodiments, generating an inspectable disk based on a snapshot of an encrypted disk will result in a snapshot which is not readable without a corresponding key.

It is beneficial for the inspecting cloud environment to be able to inspect such encrypted disks. In an embodiment, encryption of the disk is provided at the cloud level, application level, a combination thereof, and the like.

While some embodiments illustrate user of cloud managed encryption in AWS, and application level encryption in Azure, it should be readily apparent that the teachings herein can be applied to other cloud infrastructures with appropriate adjustments.

At S210, an encrypted disk is selected for inspection. In an embodiment, the encrypted disk is associated with a virtual workload, for example by provisioning a storage resource to the virtual workload. In an embodiment, a virtual workload is, for example, a virtual machine, a serverless function, a software container, and the like. In an embodiment, an inspection account (i.e., a service account) is utilized in determining that a disk is encrypted in a production cloud environment.

For example, in an embodiment a service account is authorized to access a disk, access metadata of a storage disk, access a storage provisioning system, and the like, to determine if a disk is an encrypted disk. In an embodiment, an encrypted disk includes metadata which indicates that the disk is an encrypted disk.

At S220, a check is performed to determine a level of encryption. In an embodiment, a disk is encrypted at application level, encrypted at cloud level, a combination thereof, and the like. In an embodiment, cloud level encryption (also referred to as cloud managed encryption) includes utilizing a key of a Key Management System (KMS) to encrypt a disk. In an embodiment, if the disk is encrypted at the application level execution continues at S230.

In some embodiments, if the disk is encrypted using cloud managed encryption execution continues at S240. In an embodiment, a disk may be encrypted utilizing one or more methods of cloud managed encryption and application level encryption. The methods for accessing such disks may be used consecutively, until a fully decrypted disk is accessible.

At S230, a check is performed to determine a key type. In an embodiment, a key type is a default key, a custom key, and the like. For example, a KMS in AWS supports two types of keys. The first type is an Elastic Block Store (EBS) default key, and the second type is a custom key. A policy associated with the default key cannot be changed, while for a custom key the policy can be configured, and reconfigured. If the key is a custom key execution continues at S260, according to an embodiment. In an embodiment, if the key is a default key, execution continues at S270.

At S240, a key is fetched from the key vault. For example, in an embodiment, Azure Key Vault is utilized as a KMS, implemented in Azure® cloud environments. At an application level encryption, a disk may be encrypted using Bitlocker (for Windows® operating systems), Cryptoluks (for Linux operating systems), and like, in some embodiments. An inspector account is authorized to fetch keys from a key vault, according to an embodiment. In certain embodiments, a key is a KEK (key encryption key), meaning that the key is encrypted using another asymmetric encryption, and this needs to be decrypted as well.

At S250, the disk is decrypted. In an embodiment the disk is decrypted using the key fetched from the key vault. In some embodiments, an inspectable disk is generated from the decrypted disk, and access thereto is provided to an inspecting cloud environment, where the inspectable disk is inspected for cybersecurity objects. In an embodiment, a disk is encrypted at application level utilizing based on the operating system, for example Microsoft® Windows, or Linux.

Linux disks utilize Cryptoluks, which, in an embodiment, contains two partitions, a first partition which is encrypted and a second partition which is plaintext. The plaintext partition is mounted in the inspecting cloud environment, according to an embodiment. In some embodiments, the plaintext partition includes a file named 'osluksheader' which appears in the 'luks' directory. In an embodiment, an inspector is configured to execute a decrypt command, for example:

```
sudo cryptsetup open /dev/<encrypted-device> <name>--header=/
<mountpoint>/luks/osluksheader
```

When prompted for a password, the passphrase (i.e., key) is provided after decoding the base64 through the pipe connected to the stdin. The result is a readable disk which is mountable using the device mapper, for example:

```
mount /dev/mapper/<name> <mount point>
```

In an embodiment the disk is mounted, for example on a volume which is provisioned in an inspection cluster. In certain embodiments, an inspector is configured to search the disk for data objects (e.g., cybersecurity objects) which are utilized to assess security risks and map the disk, its contents, the corresponding workload, a combination thereof, and the like, to a security graph.

Windows operating system utilizes the Bitlocker application, according to an embodiment. Decrypting a Bitlocker encrypted disk includes, in an embodiment, setting the decoded base64 key from the keyvaults on the disk <secret-file.dat>. Decryption includes, according to an embodiment, executing the following command:

```
do dislocker /dev/<encrypted-device> -f <secret-file.bek> -- /media/
<unencrypted-device>
```

In an embodiment, initiating execution of the command is performed by the inspector account. A decrypted disk is mounted, according to an embodiment, by initiating execution of the following instruction:

```
mount /media/<unencrypted-device>/dislocker-file /<mount-point>
```

In an embodiment, the instruction is executed by a control plane of a software container cluster in an inspection environment. A mounted disk, for example on a volume which is provisioned in an inspection software container cluster, is inspected for cybersecurity objects. In some embodiments, the disk, its contents, any detected cybersecurity object, and a corresponding workload, are represented on a security graph.

At S260, the disk is decrypted using the custom key. In some embodiments, decryption utilizing a custom key is described in more detail with respect to FIG. 3.

At S270, the disk is decrypted using the default key. Decryption utilizing a default key is described in more detail with respect to FIG. 4.

Figure 3:
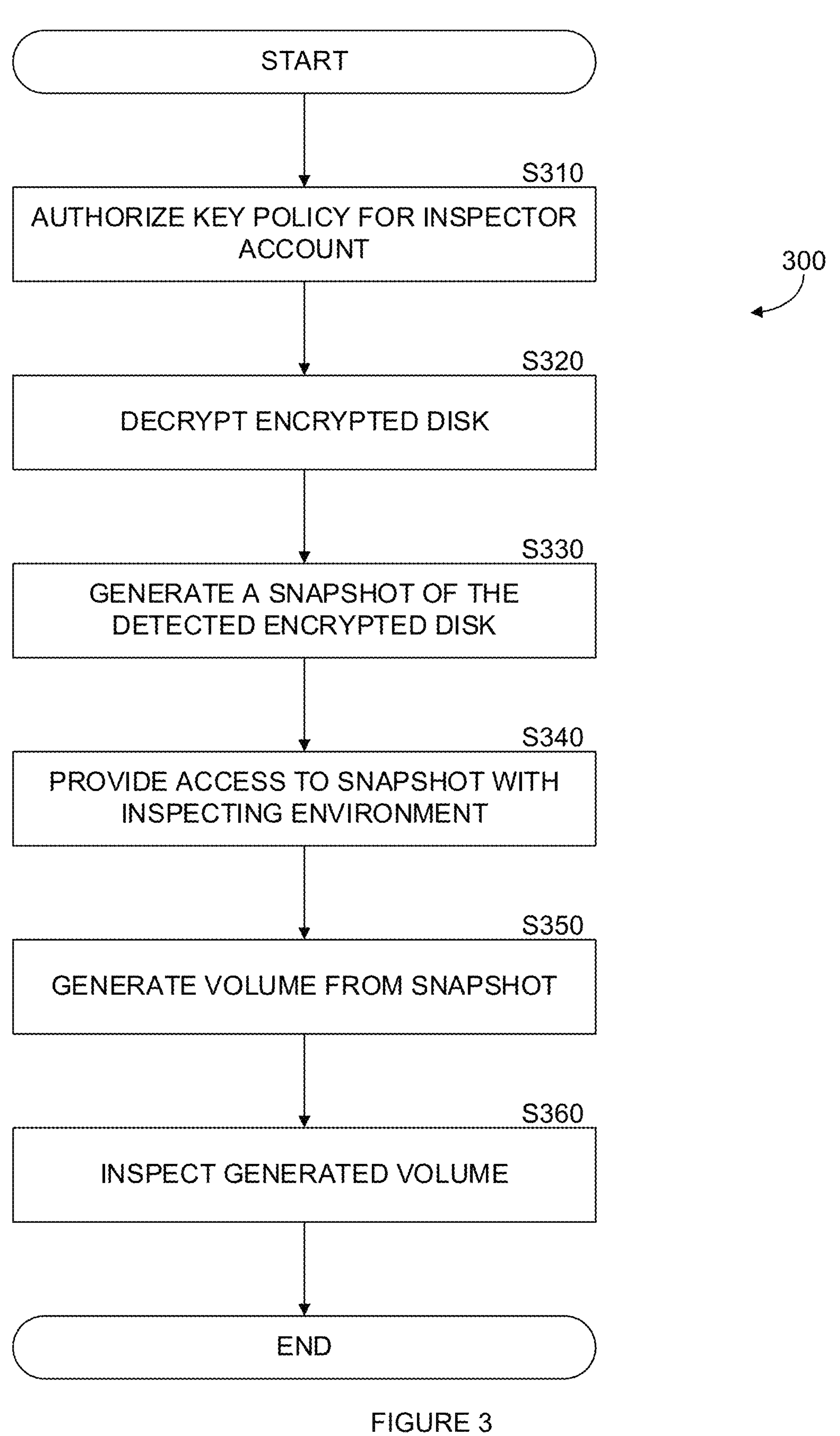
FIG. 3 is a flowchart of a method for disk decryption utilizing a custom key for security risk inspection, implemented in accordance with an embodiment.

FIG. 3 is an example of a flowchart 300 of a method for disk decryption utilizing a custom key for inspecting a disk for a cybersecurity object, implemented in accordance with an embodiment.

At S310, a key policy is attached to a custom key. The custom key is used for decrypting an encrypted disk in a cloud computing environment. In an embodiment, AWS KMS is used in an AWS cloud environment. A kms:PutKeyPolicy instruction is set to provide cross-account permissions, allowing an inspector account access to the required decryption keys, according to an embodiment.

In certain embodiments, the KMS is configured to provide certain instructions (such as DescribeKey, CreateGrant, GenerateDataKey, ReEncrypt, Decrypt, etc.) only to keys in the KMS which have a tag corresponding to permissions granted to the inspector account.

At S320, the encrypted disk is decrypted. In an embodiment, the decrypted disk is utilized in generating an inspectable disk. In some embodiments, the encrypted disk is decrypted by executing an instruction initiated by an inspector account utilizing the decryption key accessed from the KMS, access to which was previously provided to the inspector account.

At S330, an inspectable disk is generated based on the decrypted disk. In certain embodiments, generating an inspectable disk includes generating a clone, a copy, a snapshot, and the like, based on the decrypted disk. In an embodiment the instruction for generating the inspectable disk is initiated by the inspector account.

At S340, access to the inspectable disk is provided to an inspector. In an embodiment, providing access to an inspector includes providing access to the inspectable disk to a service account (e.g., inspector account) which is configured to be assumed by an inspector workload.

In an embodiment, providing access includes sending a copy, a pointer of a clone, a snapshot, and the like, from the inspector account to the inspecting environment over a secure communication channel, such as a secure shell (SSH) communication.

At S350, a volume is generated from the inspectable disk. In an embodiment, a software container cluster is configured to provision a storage, into which a volume is generated based on the inspectable disk.

At S360, an instruction is generated to inspect the volume. In an embodiment, the volume is inspected for cybersecurity objects. In some embodiments, inspection includes searching the volume for files, text, regular expressions (regex), secrets, keys, application identifiers, malware signatures, virtual workloads, misconfigurations, combinations thereof, and the like.

Figure 4:
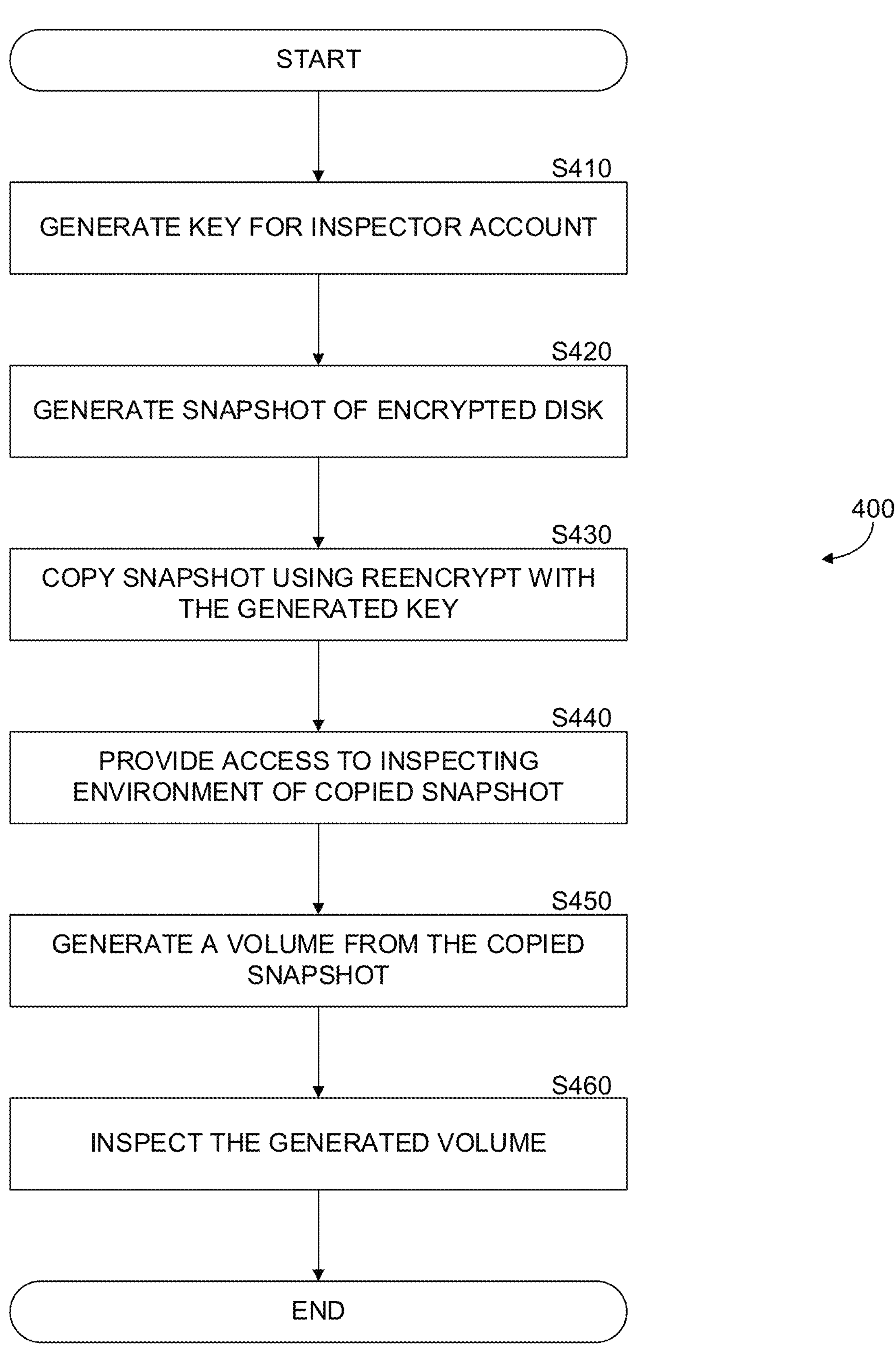
FIG. 4 is a flowchart of a method for disk decryption utilizing a default key for security risk inspection, implemented in accordance with an embodiment.

FIG. 4 is an example flowchart 400 of a method for disk decryption utilizing a default key for detecting cybersecurity objects, implemented in accordance with an embodiment. In certain cloud infrastructures, such as AWS, default keys do not support changing of an attached security policy.

At S410, a key is generated for an inspector account. In an embodiment, the key is generated to allow cross account access, with permissions for the inspector account. For example, an encrypted disk is selected, and a key is generated for the inspector account, to allow the inspector account to access the encrypted disk, according to an embodiment. In some embodiments, the inspector account is a service account which is configured to be assumed by an inspector workload.

At S420, a snapshot is generated of the encrypted disk. In an embodiment, generating the snapshot is performed based on executing an instruction initiated by an inspector account. In certain embodiments, the snapshot is a block-based copy of the encrypted disk at a particular point in time.

At S430, the snapshot is copied with a reencrypt command. Copying a snapshot includes, in an embodiment, executing a CopySnapshot instruction with a ReEncrypt instruction, where reencryption is performed with the generated key. In an embodiment, the instructions are provided by the inspector account, which has kms:CreateGrant and kms:ReEncryptFrom permissions from the KMS.

At S440, access is provided to the copied snapshot. In an embodiment, access is provided to an inspecting cloud environment, such as the inspecting cloud environment 104 of FIG. 1 above, and specifically to an inspector, for example by providing authorization to an inspector account to access the copied snapshot. In an embodiment, the copied snapshot is decrypted using the generated key for the inspector account. The key is provided to the inspector account, according to some embodiments.

At S450, a volume is generated from the copied snapshot. In an embodiment, a software container cluster is configured to provision a storage space, into which a volume is generated based on the copied snapshot of the decrypted disk.

At S460, the generated volume is inspected for a cybersecurity object. In an embodiment, inspection includes searching the volume for a file, a text, a regular expression (regex), a secret, a key, a certificate, a virtual workload, a combination thereof, and the like.

Figure 5:
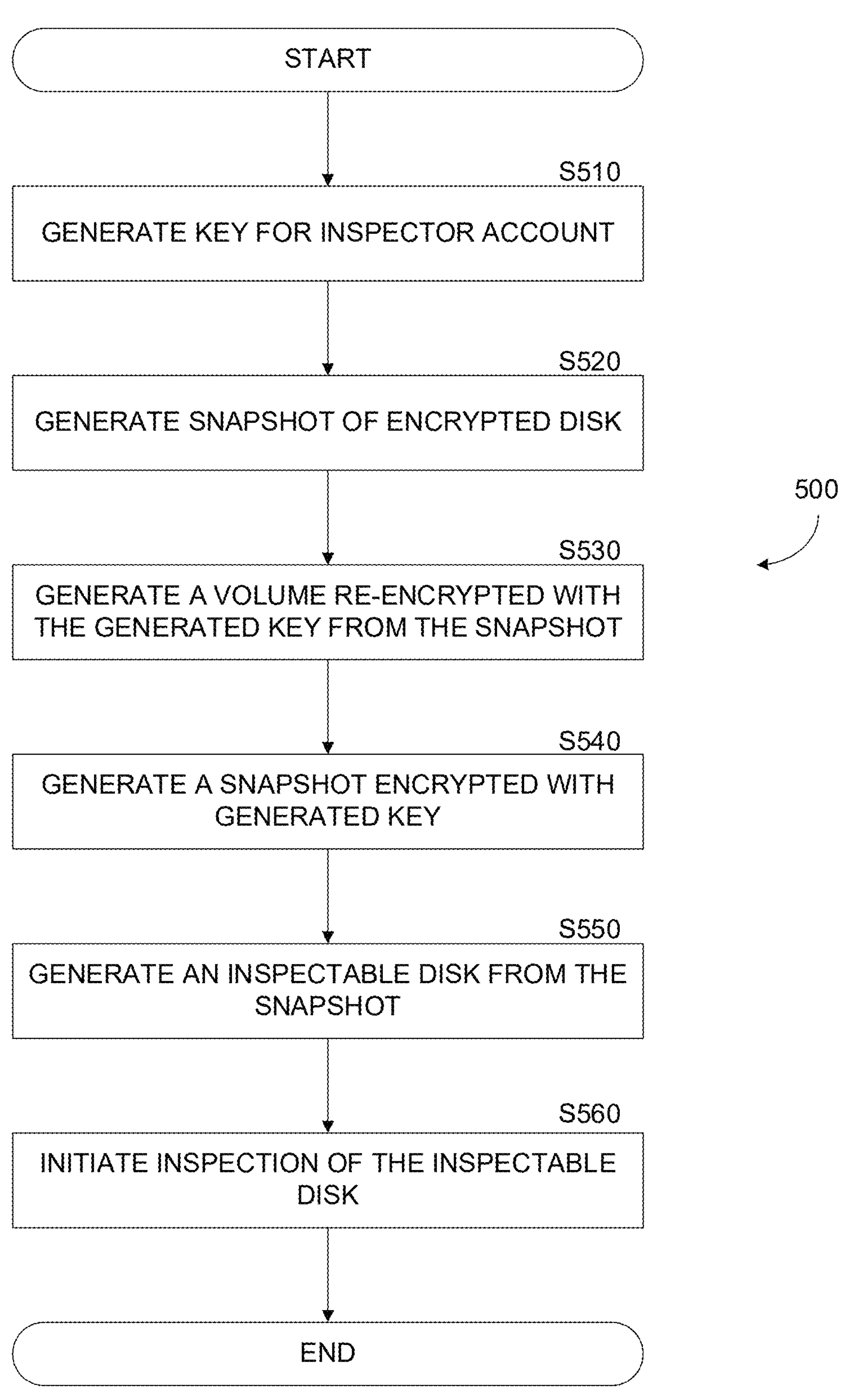
FIG. 5 is a flowchart of a method for reducing use of snapshot copy operations in cybersecurity inspection, implemented in accordance with an embodiment.

FIG. 5 is a flowchart 500 of a method for reducing use of snapshot copy operations in cybersecurity inspection, implemented in accordance with an embodiment. In some embodiments, operations such as CopySnapshot in an Amazon® Web Services (AWS) environment are limited, restricted, and the like, for example, to a certain number of operations in a given time frame, to a given number of concurrent operations of a first type, a combination thereof, and the like. It is therefore advantageous to provide an alternate method to reduce use of limited operations.

At S510, a key is generated for an inspector account. In an embodiment, the key is generated to allow cross account access, with permissions for the inspector account. For example, an encrypted disk is selected, and a key is generated for the inspector account, to allow the inspector account to access the encrypted disk, according to an embodiment. In some embodiments, the inspector account is a service account which is configured to be assumed by an inspector workload.

At S520, a snapshot is generated of an encrypted disk. In an embodiment, the snapshot is stored in a cloud computing environment which is not an inspection environment. In certain embodiments, an instruction which when executed configures a cloud computing environment to generate a snapshot of an encrypted disk, is initiated by an inspector, and inspection controller, and the like.

In an embodiment, the snapshot is encrypted with a key, such as an asymmetric cryptographic encryption key. In some embodiments, the snapshot is encrypted with the same key as the encrypted disk, which the inspection environment does not have access to. In an embodiment, a key which the inspection environment does not have access to is a key which is inaccessible to an inspector, an inspector controller, a principal, a resource, and the like, of an inspection environment.

At S530, a volume is generated with a second key. According to an embodiment, the volume is generated by initiating an instruction in a cloud computing environment which generate a volume which is re-encrypted using the generated key. In certain embodiments, the volume is generated based on the encrypted snapshot.

In some embodiments, the volume is generated utilizing kms:CreateGrant in order to generate a key with a policy which allows access to a KMS key for an inspector (or other principal of the inspection environment), and kms:ReEncryptFrom, which allows to change the first key from the KMS which the inspection environment does not have access to, to the generated key which the inspection environment does have access to (i.e., via execution of the kms:CreateGrant command).

At S540, a snapshot is generated from the re-encrypted volume. In an embodiment, the snapshot is stored in a cloud computing environment which is not an inspection environment. In certain embodiments, an instruction which when executed configures a cloud computing environment to generate a snapshot of the re-encrypted volume, is initiated by an inspector, and inspection controller, and the like.

In an embodiment, the snapshot is encrypted with a key, such as an asymmetric cryptographic encryption key. In some embodiments, the snapshot is encrypted with the same key as the re-encrypted volume, which the inspection environment has access to.

At S550, an inspectable disk is initiated from the snapshot. In an embodiment, initiating an inspectable disk includes generating a snapshot from the re-encrypted volume, and generating an inspectable disk (e.g., a decrypted disk) based on the generated snapshot.

At S560, inspection of the inspectable disk is initiated. In an embodiment, a generated volume (e.g., an inspectable disk) is inspected for a cybersecurity object. In an embodiment, inspection includes searching the inspectable disk for a file, a text, a regular expression (regex), a secret, a key, a certificate, a virtual workload, a malware, a misconfiguration, an exposure, a vulnerability, a combination thereof, and the like.

Figure 6:
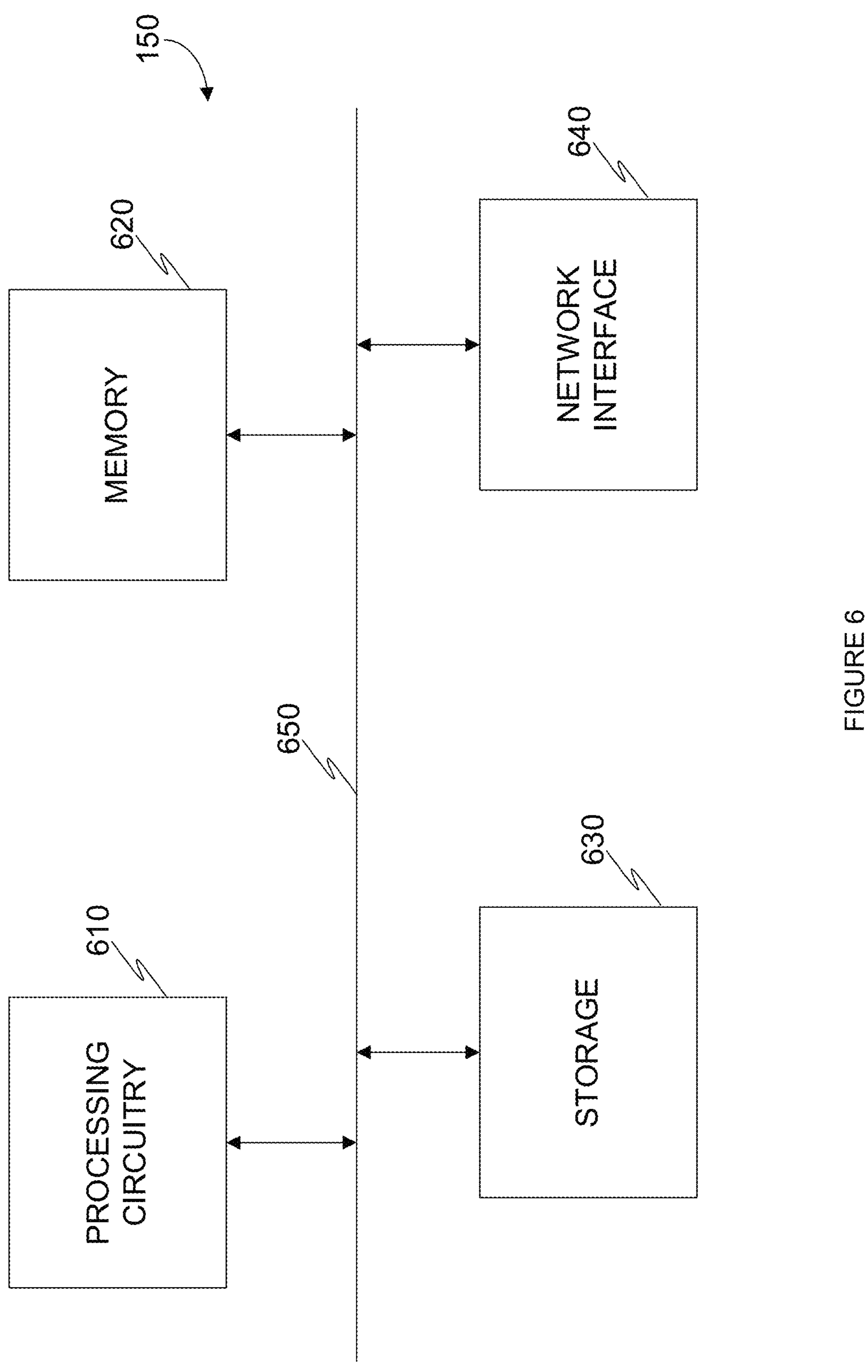
FIG. 6 is a schematic diagram of a system configured to execute an inspector according to an embodiment.

FIG. 6 is an example schematic diagram of an inspector 150 according to an embodiment. The inspector 150 includes a processing circuitry 610 coupled to a memory 620, a storage 630, and a network interface 640. In an embodiment, the components of the inspector 150 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the inspector 150 with communication with, for example, the inspector account 130, the container cluster 160, and the like.

It should be understood that the embodiments described herein are not limited to the specific architecture illustrated in FIG. 6, and other architectures may be equally used without departing from the scope of the disclosed embodiments.

Furthermore, in certain embodiments the virtual workload 110, the database 170, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for reducing use of restricted operations in a computing environment during cybersecurity threat inspection, comprising:

detecting an encrypted disk in a computing environment, the encrypted disk associated with a first key in a key management system (KMS), the first key authorized for use by a first principal of the computing environment;

generating a second key in the KMS, the second key associated with an entity of an inspection environment;

generating a copy of the encrypted disk;

generating a volume based on the copy;

re-encrypting the volume with the second key; and initiating inspection for a cybersecurity object on the re-encrypted volume.

2. The method of claim 1, further comprising:

generating a snapshot of the re-encrypted volume;

generating an inspectable disk based on the generated snapshot of the re-encrypted volume; and initiating inspection of the inspectable disk for the cybersecurity object.

3. The method of claim 1, further comprising:

generating a cloned disk based on the re-encrypted volume;

generating an inspectable disk based on the cloned disk; and initiating inspection of the inspectable disk for the cybersecurity object.

4. The method of claim 1, further comprising:

generating the second key in response to determining that a policy associated with the first key forbids granting access of the first key to the entity of the inspection environment.

5. The method of claim 1, further comprising:

detecting metadata associated with the encrypted disk; and determining that the encrypted disk is encrypted based on the detected metadata.

6. The method of claim 1, further comprising:

inspecting the re-encrypted volume for any one of: a file, a text, a regular expression (regex), a secret, a key, a certificate, a virtual workload, and any combination thereof.

7. The method of claim 1, further comprising:

generating the second key utilizing any instruction of: kms:CreateGrant, kms:CreateKey, kms:PutKeyPolicy, and any combination thereof.

8. The method of claim 1, further comprising:

generating the volume utilizing any instruction of: kms: ReEncryptFrom, kms:ReEncryptTo, and any combination thereof.

9. The method of claim 1, further comprising:

generating a decrypted inspectable disk, based on the second key.

10. A non-transitory computer-readable medium storing a set of instructions for reducing use of restricted operations in a computing environment during cybersecurity threat inspection, the set of instructions comprising:

one or more instructions that, when executed by one or more processing circuitries of a device, cause the device to:

detect an encrypted disk in a computing environment, the encrypted disk associated with a first key in a key management system (KMS), the first key authorized for use by a first principal of the computing environment;

generate a second key in the KMS, the second key associated with an entity of an inspection environment;

generate a copy of the encrypted disk;

generate a volume based on the copy;

re-encrypt the volume with the second key; and initiate inspection for a cybersecurity object on the re-encrypted volume.

11. A system for reducing use of restricted operations in a computing environment during cybersecurity threat inspection comprising:

one or more processing circuitries configured to:

detect an encrypted disk in a computing environment, the encrypted disk associated with a first key in a key management system (KMS), the first key authorized for use by a first principal of the computing environment;

generate a second key in the KMS, the second key associated with an entity of an inspection environment;

generate a copy of the encrypted disk;

generate a volume based on the copy;

re-encrypt the volume with the second key; and initiate inspection for a cybersecurity object on the re-encrypted volume.

12. The system of claim 11, wherein the one or more processing circuitries are further configured to:

generate a snapshot of the re-encrypted volume;

generate an inspectable disk based on the generated snapshot of the re-encrypted volume; and initiate inspection of the inspectable disk for the cybersecurity object.

13. The system of claim 11, wherein the one or more processing circuitries are further configured to:

generate a cloned disk based on the re-encrypted volume;

generate an inspectable disk based on the cloned disk; and initiate inspection of the inspectable disk for the cybersecurity object.

14. The system of claim 11, wherein the one or more processing circuitries are further configured to:

generate the second key in response to determining that a policy associated with the first key forbids granting access of the first key to the entity of the inspection environment.

15. The system of claim 11, wherein the one or more processing circuitries are further configured to:

detect metadata associated with the encrypted disk; and determine that the encrypted disk is encrypted based on the detected metadata.

16. The system of claim 11, wherein the one or more processing circuitries are further configured to:

inspect the re-encrypted volume for any one of:

a file, a text, a regular expression (regex), a secret, a key, a certificate, a virtual workload, and any combination thereof.

17. The system of claim 11, wherein the one or more processing circuitries are further configured to:

generate the second key utilizing any instruction of: CreateGrant, kms:CreateKey, kms:PutKeyPolicy, and any combination thereof.

18. The system of claim 11, wherein the one or more processing circuitry are further configured to:

generate the volume utilizing any instruction of: ReEncryptFrom, kms:ReEncryptTo, and any combination thereof.

19. The system of claim 11, wherein the one or more processing circuitry are further configured to:

generate a decrypted inspectable disk, based on the second key.

* * * * *